Feb. 6, 1951   J. C. BAGLEY   2,540,857
NUT PICKUP DEVICE
Filed May 18, 1948
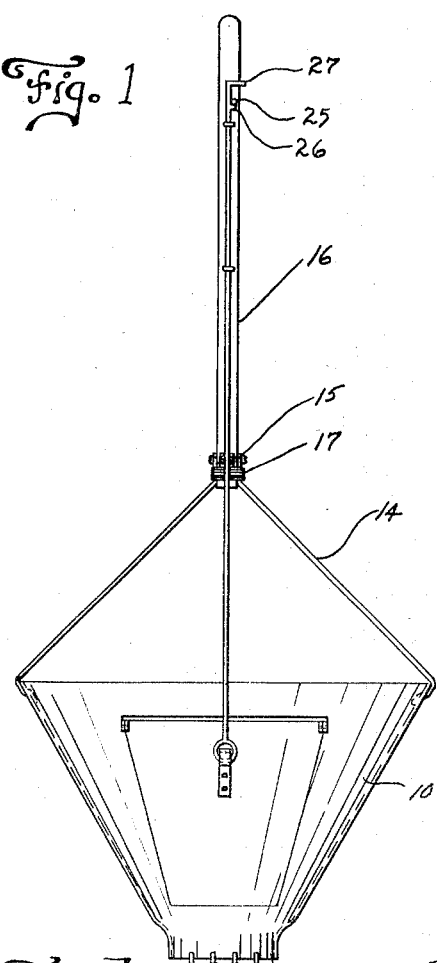
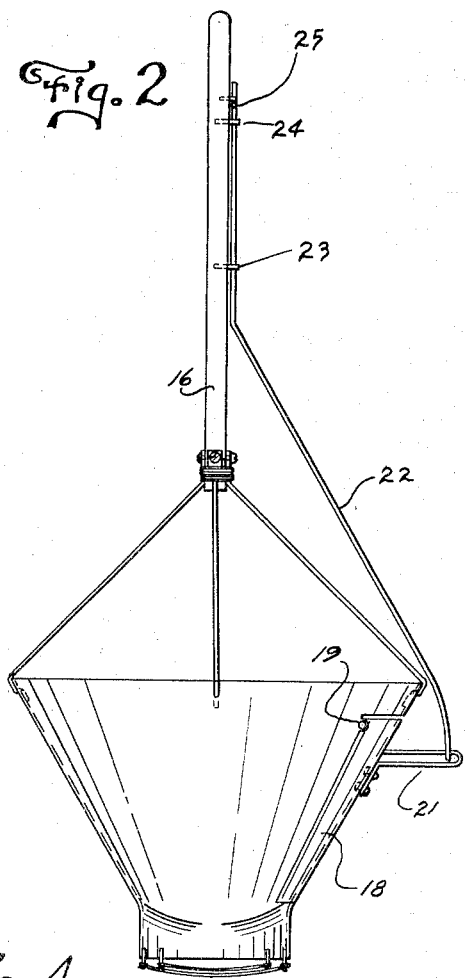
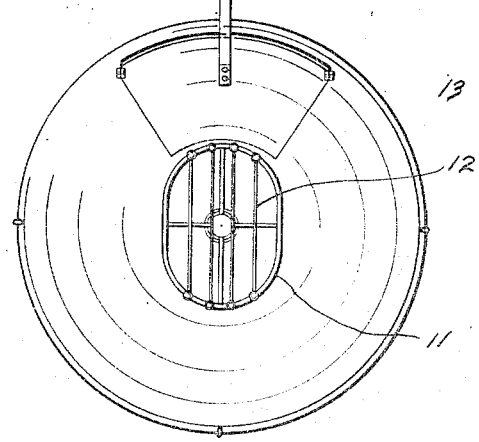
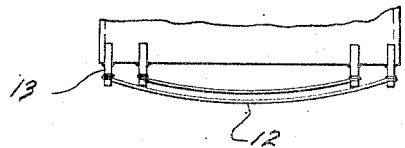
INVENTOR.
Joseph Clinton Bagley
BY Victor J. Evans & Co.
ATTORNEYS Patented Feb. 6, 1951

2,540,857

UNITED STATES PATENT OFFICE 2,540,857

NUT PICKUP DEVICE

Joseph Clinton Bagley, Selma, Ala.

Application May 18, 1948, Serial No. 27,644

2 Claims. (Cl. 294—19)

This invention relates to a nut pick up device.

It is an object of the present invention to provide a nut pick up device whereby nuts which have fallen on the ground can be picked up therefrom by encompassing the same with the lower end of the device and with slight pressure causing the nuts to be extended upwardly through spring wires which serve to retain the same within a compartment and thereafter permitting the device to be extended to other locations over the ground for collecting other nuts, the nuts being dischargeable from an opening in the side of the compartment or from the top thereof after the compartment has been filled.

Other objects of the present invention are to provide a nut pick up device which is of simple construction, inexpensive to manufacture and efficient in operation.

For other objects and for a better understanding of the invention, reference may be had to the following detailed description taken in connection with the accompanying drawing, in which Fig. 1 is an elevational view of the nut pick up device embodying the features of the present invention.

Fig. 2 is an elevational view looking upon a different side of the device.

Fig. 3 is a bottom plan view of the device.

Fig. 4 is an enlarged fragmentary side elevational view of the lower end of the device.

Referring now to the figures, 10 represents a funnel-shaped body member having an open bottom end 11 across which are extended a plurality of spring wires 12. These wires are connected from one side to the other on posts 13 welded to the bottom lower edge and projected downwardly therefrom. These wires are laterally spaced from one another a distance less than the diameter of the nuts to be picked up but will give sufficiently to permit the nuts to be passed between wires. The wires after receiving the nuts will spring to their normal position and will retain them within the funnel-shaped member 10. At the top of the member 10 there are extended upwardly and toward the center a plurality of rods 14 which are secured by screws 15 to a long handle 16 by means of which the device is extended over the nuts and lifted from the ground with the nuts. In order to strengthen the connection of the rods 14 with the handle 16, there is provided a lacing 17.

On one side of the member 10 is a door 18 which can be pivoted upwardly and outwardly about a pivot as indicated at 19 for the purpose of discharging the nuts which have been collected. An arm 21 extends outwardly from the door 18 and has an operating rod 22 connected to its outer end and extending upwardly along the handle 16 and through eyelets 23 and 24 thereon.

On the handle is a stop pin 25 adapted to receive a projection 26 on the rod whereby to lock the door in its closed position. The projection 26, when locked on the pin, lies below the pin 25. A handle or finger-engaging portion 27 extends outwardly from the upper end of the rod and by means of this handle the rod is elevated and the door raised after releasing the projection 26 from the pin 25. Thereafter the rod can be locked to the pin 25 and the device again used to pick up a new collection of nuts.

While various changes may be made in the detail construction, it shall be understood that such changes shall be within the spirit and scope of the present invention as defined by the appended claims.

I claim:

1. A device for picking up nuts comprising a funnel-shaped body member provided with an open bottom end adapted to provide a compartment for receiving nuts, a plurality of posts extending downwardly from said body member, a plurality of spring wires arranged in spaced parallel relation across the bottom end of said body member and secured to said posts, the space between said wires being less than the diameter of the nuts and the wires adapted to flex to permit the passage of nuts therebetween, rods extending upwardly from said body member and toward the center thereof, a handle extending upwardly from the top of said rods and secured thereto, a door hingedly connected to said body member, manually operable means for actuating said door, said means comprising an arm projecting from said door, a rod slidably connected to said handle and having its lower end connected to said arm, and a finger-engaging portion arranged on the other end of said rod.

2. A device for picking up nuts comprising a funnel-shaped body member provided with an open bottom end adapted to provide a compartment for receiving nuts, a plurality of posts extending downwardly from said body member, a plurality of spring wires arranged in spaced parallel relation across the open bottom end of said body member and secured to said posts, the space between said wires being less than the diameter of the nuts and the wires adapted to flex to permit the passage of nuts therebetween, rods extending upwardly from said body member and toward the center thereof, a handle extending upwardly from the top of said rods and secured thereto, a door hingedly connected to said body member, manually operable means for actuating said door, said means comprising an arm projecting from said door, a rod slidably connected to said handle and having its lower end connected to said arm, a finger-engaging portion arranged on the other end of said rod, and means for locking the door in closed position.

JOSEPH CLINTON BAGLEY.

REFERENCES CITED

The following references are of record in the file of this patent:

UNITED STATES PATENTS

| Number | Name | Date |
|---|---|---|
| 698,226 | Roberts | Apr. 22, 1902 |
| 704,848 | Minton | July 15, 1902 |
| 1,298,923 | Franke | Apr. 1, 1919 |